March 15, 1927.
M. B. PRICE
1,621,484
ADJUSTABLE WINDOW HANGER
Filed April 18, 1921    2 Sheets-Sheet 1
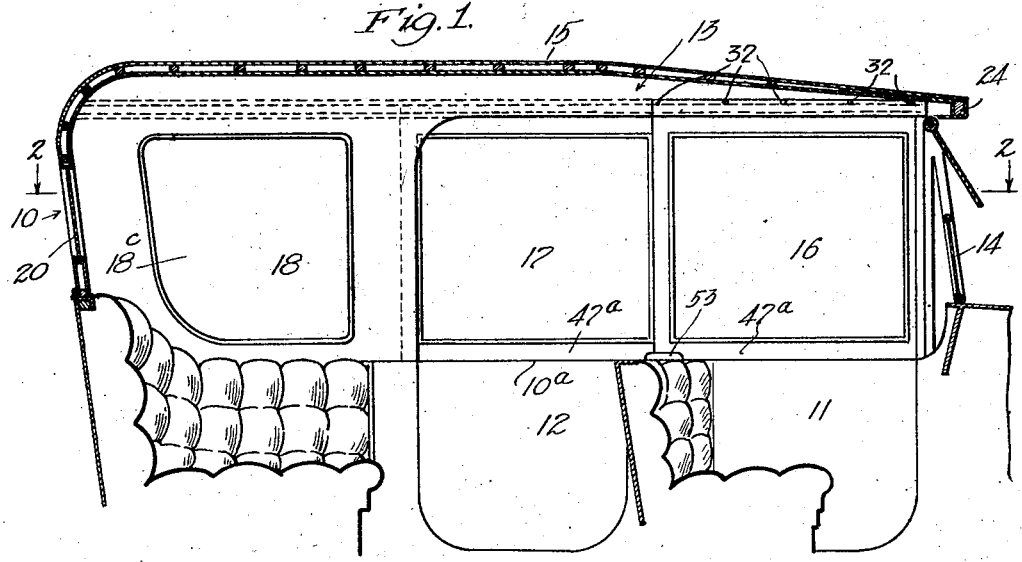
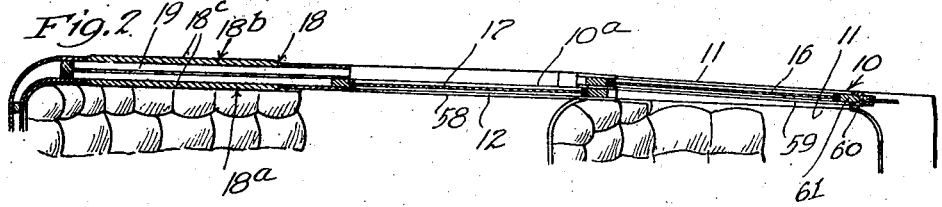
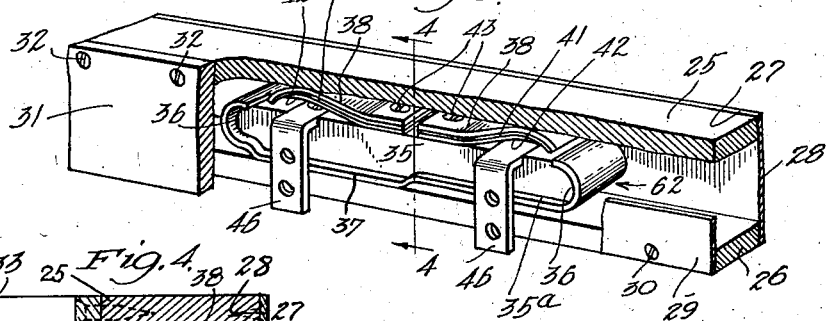
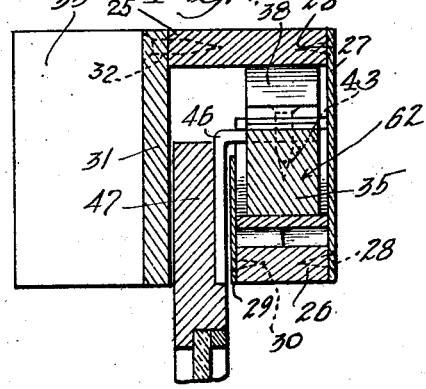
Inventor:
Melvin B. Price
By James T. Batchelor
his Attorney March 15, 1927.
M. B. PRICE
1,621,484
ADJUSTABLE WINDOW HANGER
Filed April 18, 1921      2 Sheets-Sheet 2
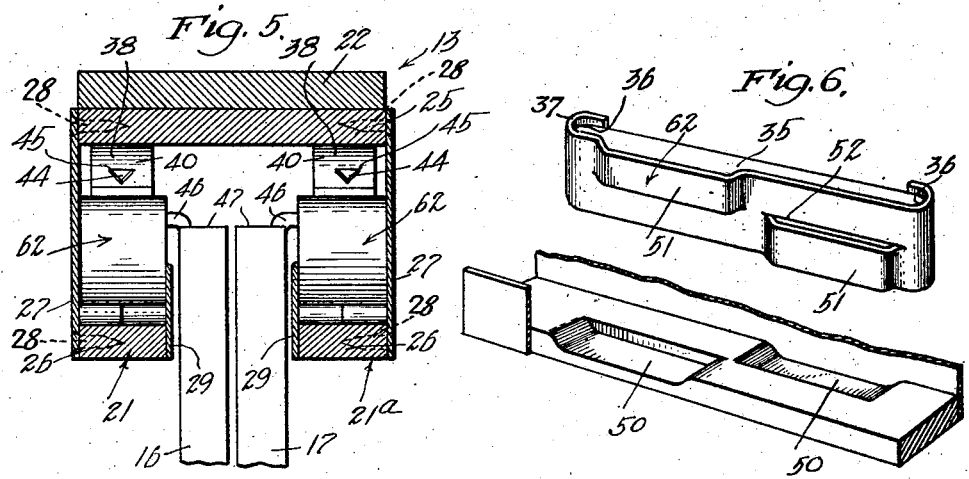
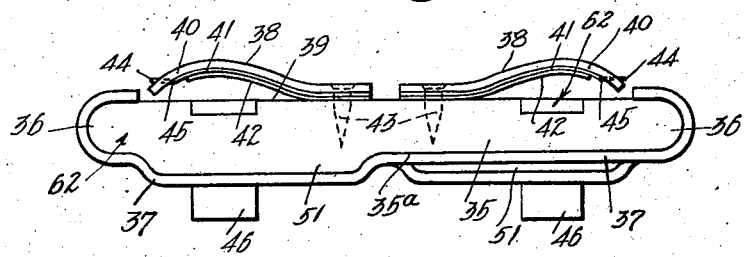
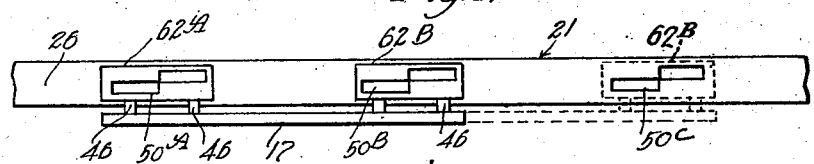
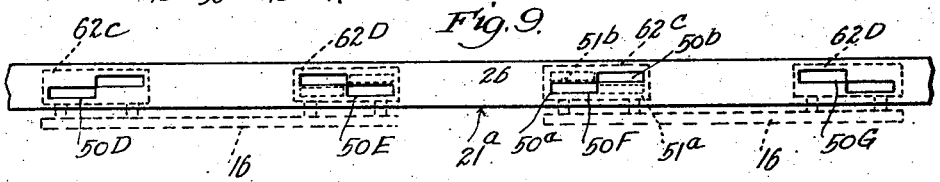
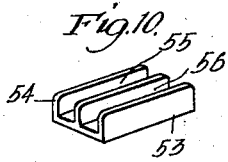
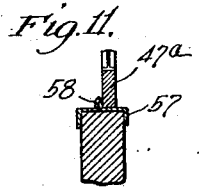
Inventor:
Melvin B. Price
By
his Attorney Patented Mar. 15, 1927.

1,621,484

UNITED STATES PATENT OFFICE.

MELVIN B. PRICE, OF LOS ANGELES, CALIFORNIA; LYDIA ANN PRICE EXECUTRIX OF SAID MELVIN B. PRICE, DECEASED.

ADJUSTABLE WINDOW HANGER.

Application filed April 18, 1921. Serial No. 462,111.

The present invention relates generally to adjustable hangers or supports for windows, curtains and the like; and the preferred specific embodiment as herein described is designed with a particular view to its use in connection with side curtains, or windows, for motor vehicle tops; whereby an open top, commonly used on automobiles of the touring car type, may be easily and quickly converted into a closed top, of the limousine or sedan type.

This use of the invention in connection with motor vehicle tops will be explained merely to set forth the principles of its construction and operation, and is not to be construed as a limitation of the invention to that particular use, as its uses may be many and varied.

In designing and perfecting my invention my foremost object was to produce a device of this character which would be simple, durable and inexpensive to manufacture; embodying means to permit adjustment of the windows to various positions, and to yieldingly hold them in such position, while at the same time preventing rattling due to vibrations of the vehicle.

The details of the invention will be fully set forth in the following specification, reference being made therein to the accompanying drawings, forming a part thereof, and in which—

Fig. 1 is a longitudinal section through the center of a motor vehicle body and top showing my invention as applied thereto; Fig. 2 is a longitudinal sectional plan view of one side, being taken as indicated by line 2—2 of Fig. 1; Fig. 3 is an enlarged perspective view, showing in detail one of the supporting shoes and its supporting track; Fig. 4 is a transverse vertical section therethrough taken as indicated by line 4—4 of Fig. 3; Fig. 5 is a view similar to Fig. 4, only showing a double track arrangement for supporting two windows; Fig. 6 is a fragmentary perspective view showing in detail the co-operative locking means between one of the supporting shoes and its supporting track; Fig. 7 is a side elevation of one of the supporting shoes; Fig. 8 is a diagrammatic plan view showing one arrangement of the co-operative locking means between the shoes; Fig. 9 is a diagrammatic plan view, similar to Fig. 8, showing another arrangement of the shoes; Fig. 10 is a perspective view of a flanged guide plate for the windows; and Fig. 11 is a sectional detail showing the sealing rib along the top of the vehicle body.

Referring now to the drawings, and particularly to Fig. 1, the numeral 10 designates a typical motor vehicle body, having front and rear doors 11 and 12, for entrance and exit; a top 13 and front windshield 14. The top 13 may be of any suitable design and construction, and may have any type of covering such as cloth, fabric, leather or the like, but is preferably of the permanent type, that is, constructed to remain in the position shown and ordinarily not adapted to fold up or be collapsible; however, such a construction may be arranged if desired. The space between the top portion 15 of the top 13, and the top edge 10$^a$ of the body 10, is adapted to be enclosed by sliding panels or windows 16 and 17, and a panel 18; the latter preferably being constructed as a permanent part of the top, and to consist of a pair of inner and outer panels 18$^a$ and 18$^b$, respectively, and having glass panels 18$^c$, if desired. The panels 18$^a$ and 18$^b$ are so constructed and mounted upon the vehicle body as to form a space 19 therebetween. Preferably the portion 18 extends rearwardly from the rear edge of the rear door 12, to a juncture with the back 20, of the top 13, in the manner shown in the drawings.

A pair of horizontally disposed tracks 21 and 21$^a$, lying side by side (see Fig. 5) are supported along the under sides of the portion 15, upon longitudinal rails 22, forming a part of the top 13. These tracks are provided to carry shoes, generally designated by the numeral 62, slidably mounted thereon and which in turn support and carry the sliding panels or windows 16 and 17. Two tracks 21 and 21$^a$ are provided in cases where it is desired to mount two windows, such as 16 and 17 as shown, in which case the rear or inner window 17 is supported on the inner track 21, and the front or outer window carried on the outer track 21$^a$ (see Fig. 5). However, in case only one window is to be used, it is only necessary to provide a single track. When two are used, as here shown, the inner track 21 may be terminated at approximately the position of the rear edge of the rear stile of the front window 16, when it is in closed position (see Fig. 1) while the outer track 21$^a$ preferably extends the entire length of the top, abutting against a front transverse member 24, of the top structure.

When the single track is used it is constructed as illustrated in Figs. 3 and 4; and when the double track is used it is constructed as shown in Fig. 5, to the point above mentioned, and from there on the single track continues. These, however, are identical and therefore the double track will be described. It consists of a single top rail 25, and two bottom rails 26, secured together in parallel spaced relation by means of side plates 27, and screws 28. For strength and rigidity, together with lightness of construction, the plates 27 may be formed of metal, while the rails 25 and 26 are preferably constructed of wood, or the like. The rails 26 are of a total width less than the width of the rail 25, so that when they are mounted on the side plates 27 a central longitudinal space will be left between them as shown in Fig. 5. Guide plates 29, preferably constructed of light sheet metal, are secured to the inner contiguous vertical edges of the rails 26, by means of screws 30, thus forming channels in which the shoes 62 ride. The guide members extend upwardly only a short distance above the rails 26, leaving spaces between their upper edges and the under face of the rail 25.

When the double track is used in connection with a single track for the hanging of two windows, as shown in Figs. 1, 2 and 5, and the inner track 21 terminated at about the position of the rear edge of the front window, when closed, the rail 25 is cut correspondingly narrower and continued on to the front of the top, the same as the outer rail 26, and a filler piece 31 (see Figs. 1 and 4) is removably secured to the rail 25 by means of screws 32; a block 33 being secured to the filler piece 32 to close the open transverse end of the terminated track 21.

The shoes 62 consist of elongate blocks 35, preferably constructed of wood or the like, having their ends rounded, as at 36, and having their bottom surfaces 35$^a$ and these rounded ends covered with a soft cushioning material, such as leather, felt or the like. While any cushioning material may be used which will permit the shoes 62 to slide in and frictionally engage the tracks 21 and 21$^a$, and which will serve to absorb shock and prevent noise and rattling, I find leather to be the most serviceable and desirable. This material may be secured to the block 35, by cementing, gluing, or by stretching it over the bottom surface of the block and tacking at the ends 36. The blocks 35 are preferably narrower in width than the space between the side plates 27 and the guard plates 29 as shown in Fig. 4, and the material 37 cut to a width to frictionally engage these plates to make a comparatively tight sliding fit. This construction is provided to prevent transverse play of the blocks 35 in the tracks 21 and 21$^a$ and also to frictionally engage the plates to assist in holding the windows in any desired position, and to prevent rattling.

The blocks 35 are also preferably shorter in height than the space between the contiguous surfaces of the rails 25 and 26, this space being occupied, when the shoes are adjusted to the track, by a pair of yielding members 38, rigidly mounted on the top face 39 of the block, and adapted to frictionally engage the bottom face of the rail 25 to hold the shoe in yielding engagement at all times with the bottom rail 26. The members 38 are identical, being mounted in opposed relation as shown, and consists of a strip of cushioning material 40, similar to the material 37, supported on a strip of yielding resilient material 41, such as spring metal, and curved in the manner shown to present a yielding and non-binding surface to frictionally engage the top rail of the track. A similarly curved leaf spring 42 is mounted between the member 41 and the top face 39 of the block, to hold these curved portions in frictional engagement with the top rail, all these members being secured together at one end and to the back by means of screws 43. The material 40 may be secured to the member 41 in any suitable manner, as by cementing, gluing or riveting. However, by reducing the outer end of the member 41 to a point 44, and forming shoulders 45, this point may be extended through a slot in the material 40, while the shoulders engage the material on either side thereof, which will serve to hold it in proper position on the member 41.

A pair of supporting arms 46, constructed of flat metal or the like, and bent to form substantially right angular members, are carried by the blocks 35, in the manner shown, these arms being secured to the top rails 47 of the windows 16 and 17, by means of suitable screws (Figs. 4 and 7). In most cases two shoes 62 will be sufficient to support each window, although this may be varied if desired.

Thus it will be seen that the windows 16 and 17, carried on the shoes 62, which are slidably mounted on the tracks 21 and 21$^a$, may be moved from their open position, between the panels 18$^a$ and 18$^b$ of the closed portion 18, forward, to enclose the space between the doors 11 and 12 and the top portion 15, and between the windshield 14 and the closed portion 18. Also it is clear that the shoes 62, being in yielding frictional engagement with the tracks 21 and 21$^a$, will ordinarily be held in any desired position between the points stated.

In order that the windows 16 and 17 may be adjusted to thus enclose the vehicle body as easily as possible, and with as little frictional engagement as possible with the top edge 10ª of the body 10, I prefer to make these windows of a length so that when they are supported normally on the members 26 of the tracks 21 and 21ª, they will be spaced slightly from the top edge 10ª, and not in engagement therewith while being moved. However, in order that the bottom edges of the bottom rails 47ª of these windows will contact with the edge 10ª when in either open or closed position, to make a tight joint, and also to hold these windows in either open or closed position, I provide staggered recesses 50, in the track members 26 (see Fig. 6), which recesses are adapted to be engaged by complementary staggered lugs 51, formed on the bottom faces 35ª, of the blocks 35. These lugs are adapted to be covered by the material 37, as shown in Figs. 3, 6, and 7, the material being cut on a central line 52 and stretched to extend over these lugs in the manner shown. The lugs 51, and their complementary recesses 50, are preferably arranged in the manner shown, however, a different arrangement may be made and still accomplish my desired object, as will hereinafter appear. The depth of the lugs 51, and their complementary recesses 50, are preferably sufficient that when the windows 16 and 17 are moved to either their forward or rearward positions, and the lugs 51 register with the recesses 50, the bottom edges of the rails 47ª will rest upon the edge 10ª of the body 10. At all times when the lugs 51 are riding on the surface of the members 26 and 27 and when not in engagement with the recesses 50 the bottom edges of the rails 47ª are raised a distance equal to approximately the depth of the lugs above the edge 10ª.

It will be noted that the opposite ends of the recess 50 and the lugs 51 are rounded and oppositely inclined, so that the lugs will slide rather than drop into the recesses, and can be readily removed therefrom by the application of slight pressure exerted horizontally on the window.

Referring now to the diagrams shown in Figs. 8 and 9, and first to Fig. 8, I have shown the bottom rail 26, of the tracks 21, in which the recesses 50 are shown in pairs designated by the numerals 50ᴬ, 50ᴮ, and 50ᶜ. It will be noticed in this figure that the recesses 50 are all relatively staggered in the same direction. This arrangement is permissible, and preferable, for the mounting of a window designed to be moved only one window length, as for instance the window 17 of Fig. 1. In this case the recesses 50ᴬ and 50ᴮ will be engaged by the lugs 51 on the shoes 62 to hold the window 17 in its rearward position; and when it is moved to its forward position, as shown in dotted lines, the recesses 50ᴮ will be engaged by the lugs on the rear shoe 62ᴬ, while the recesses 50ᶜ will be engaged by the front shoe 62ᴮ to hold the window in this forward position. In this arrangement the recesses 50ᴮ serve for two adjustments, i. e., when engaged by the front shoe 62ᴮ when the window 17 is in rearward position, and by the rear shoe 62ᴬ when it is in its forward position.

In Fig. 9 the recesses 50ᴰ, 50ᴱ, 50ᶠ, and 50ᴳ are arranged so the window can be moved more than one window length, or two window lengths, as in the case of the window 16, in Fig. 1. In this arrangement it will be noted that the pairs of recesses are staggered in opposite directions, the recesses 50ᴰ and 50ᶠ being relatively staggered in the same direction while the recesses 50ᴱ and 50ᴳ are similarly staggered in opposite directions. The lugs 51 on the front and rear shoes 62ᴰ and 62ᶜ, respectively, are likewise staggered in opposite directions to register with the recesses 50ᴰ and 50ᴱ when the window is in its rearward position, and to correspondingly register with the recesses 50ᶠ and 50ᴳ when the window is in its forward position. The purpose of thus alternately staggering the recesses is so the forward shoe 62ᴰ will only register with the recesses 50ᴱ and 50ᴳ and when the window is being moved to its forward position the lugs 51 on the shoe 62ᴰ will not register with the recesses 50ᶠ but will ride over them in the manner indicated by dotted line; and in a like manner the lugs on the shoe 62ᶜ will not register with the recesses 50ᴱ but will also ride over them as indicated by dotted lines. In thus riding over the recesses, as in the case of the shoe 62ᴰ and recesses 50ᶠ, when the lugs 51ª is in a position registering with the recess 50ª it will be prevented from dropping into it by the lug 51ᵇ riding on the member 26; and likewise when the lug 51ᵇ is in position to register with the recess 50ᵇ it will be prevented from dropping into it by the lug 51ª riding on the surface of the member 26 after having passed the recesses.

Shoes may be utilized having only a single lug or projection on their bottoms, so positioned that only two or more of them are used upon a single window or sliding panel; these lugs will be relatively off-set in a manner similar to the two lugs on a single shoe, as illustrated in Fig. 6. In such cases only single recesses will be formed in the track, likewise relatively off-set in corresponding degree, with which the shoe lugs will register when the panel is moved to proper position.

In order to prevent lateral movement of the bottoms of the windows 16 and 17 when they are adjusted to their forward positions, as shown in Fig. 1, I provide a small plate 53, mounted on the top 10ª of the body 10, having parallel flanges 54, forming channels 55 and 56, (Fig. 10) through which the bottom rails of the windows 16 and 17 slide when being moved to open or closed position. The plate 53 is positioned between the doors 11 and 12 and at the juncture of the rear stile of the window 16 with the forward stile of the window 17, as shown in Figs. 1 and 2.

In order to provide a comparatively raintight joint between the windows 16 and 17 and the top 10ª of the body 10, I provide a cap 57 along the top 10ª of the body 10, on which is formed a rib 58 against which the inner face of the window 17 abuts, this rib also extending rearwardly between the panels 18ª and 18ᵇ to form a guide track for the window 17 when moved to a rearward position therebetween. A similar rib 59 may also be provided on the inner side of the forward door 11 against which the lower edge of the window 16 abuts to likewise form a watertight joint; and I may also provide a channel member 60, secured to the windshield 14, (Figs. 1 and 2) into which the stile 61 of the window 16, extends when in its forward position.

In connection with my particular arrangement of the tracks 21 and 21ª, as herein shown and described, attention is directed to the convenient manner in which the windows 16 and 17 may be removed for repairs and the like. It is only necessary to remove the filler piece 31, together with the filler block 33, by removal of the screws 32, leaving the forward transverse end of the track 21 open and the forward portion of the track 21ª exposed. The window 17 can be removed merely by sliding it forward to the position of the front window when closed off the track 21 through this open front end; and the window 16 may be removed merely by raising it up, and compressing the spring members 38 against the top rail 25, after which the shoe may be removed between the top edge of the guard plate 29 and the top rail.

The uses and advantages of my invention are obvious.

While I have here shown and described the preferred embodiment of my invention, it is nevertheless to be understood that I reserve the right to make any changes or modifications in structure which properly come within the scope of the appended claims.

Having described a preferred form of my invention, I claim:

1. In a device of the character described, a shoe and a track therefor, means to retain the shoe in adjusted position on the track, said means comprising a plurality of relatively staggered lugs on the shoe having oppositely inclined ends, complementary recesses in the track also having oppositely inclined ends adapted to register with and be engaged by said lugs, and yielding means to hold the shoe in engagement with the track.

2. In a device of the character described, a shoe and a track therefor, the track having two rails supported in spaced relation, means to retain the shoe in adjusted position on the track, said means comprising a plurality of relatively staggered lugs on the shoe having oppositely inclined ends and complementary recesses in one of the rails also having oppositely inclined ends adapted to register with and be engaged by the lugs, and yielding means carried by the shoe to engage the other rail to hold the shoe in engagement with the track having the recess.

3. In a device of the character described, a shoe and a track therefor, said track having top and bottom rails supported in spaced relation, means to retain the shoe in adjusted position on the track, said means comprising a plurality of relatively staggered lugs on the bottom of the shoe having oppositely inclined ends, and complementary recesses in the bottom rail also having oppositely inclined ends adapted to register with and be engaged by the lugs, and yielding means carried by the shoe and adapted to engage the top rail to hold the shoe in engagement with the bottom rail.

4. In a device of the character described, a shoe and a track therefor, said track having top and bottom rails supported in spaced relation, a side plate and a guide plate, means to retain the shoe in adjusted position on the track, said means comprising a plurality of relatively staggered lugs on the bottom face of the shoe having oppositely inclined ends, and complementary recesses in the bottom rail also having oppositely inclined ends adapted to register with and be engaged by the lugs, yielding means carried by the shoe and adapted to engage the top rail to hold the shoe in engagement with the bottom rail, said shoe and yielding means being provided with cushioning material to frictionally engage the top and bottom rails and the side and guide plates of the track.

5. An adjustable support for windows and the like, comprising a plurality of shoes adapted to carry a window, and a track therefor, means to retain the window in adjusted position on the track, said means comprising a plurality of relatively staggered lugs on the shoes, the lugs on adjacent shoes being relatively staggered in opposite relation and on alternate shoes in the same relation, and a plurality of recesses in the track adapted to register with and be engaged by the lugs when the window is adjusted to its several positions.

6. In a device of the character described, a shoe and a track therefor, means to hold the shoe in adjusted position on the track, said means comprising a plurality of relatively staggered recesses in the track having oppositely inclined ends and complementary means on the shoe to engage in said recesses.

7. In a device of the character described, a shoe and a track therefor, means to hold the shoe in adjusted position on the track, said means comprising a plurality of recesses in the track relatively off-set both laterally and longitudinally and having oppositely inclined ends, complementary means on said shoe adapted to engage in said recesses, and means to yieldingly hold said shoe in engagement with said track and recesses.

8. In a device of the character described, a plurality of shoes, a track therefor, recesses in said track relatively off-set both laterally and longitudinally and having oppositely inclined ends, each of said shoes having a portion positioned to engage in one of said recesses to hold it in adjusted position, and yielding means to normally hold said shoes in engagement with the track and recesses.

9. In a device of the character described, a shoe and a track therefor, the track having two rails supported in spaced relation, means to retain the shoe in adjusted position on the track, said means comprising relatively staggered recesses having oppositely inclined ends in one of the track rails and complementary means on said shoe adapted to engage in said recesses, and yielding means carried by the shoe adapted to engage the other rail and hold the shoe in yielding engagement with the track having the recesses.

In witness that I claim the foregoing I have hereunto subscribed my name this 9th day of April, 1921.

MELVIN B. PRICE.